C. MURRAY.
Combined Rakes and Tedders.

No. 152,000. Patented June 16, 1874.

WITNESSES
F. F. Warner.
N. C. Gridley

INVENTOR
Charles Murray

UNITED STATES PATENT OFFICE.

CHARLES MURRAY, OF CHICAGO, ILLINOIS, ASSIGNOR TO NELSON C. GRIDLEY AND HENRY F. LEOPOLD, JR., OF SAME PLACE.

IMPROVEMENT IN COMBINED RAKES AND TEDDERS.

Specification forming part of Letters Patent No. 152,000, dated June 16, 1874; application filed February 10, 1874.

*To all whom it may concern:*

Be it known that I, CHARLES MURRAY, of Chicago, in the county of Cook and State of Illinois, have invented a new, useful, and Improved Hay Tedder and Rake, of which the following is a full, clear, and exact description, which will enable others skilled in the art to which my invention appertains to make and use the same, reference being had to the accompanying drawing, forming a part hereof, and in which—

Figure 1:
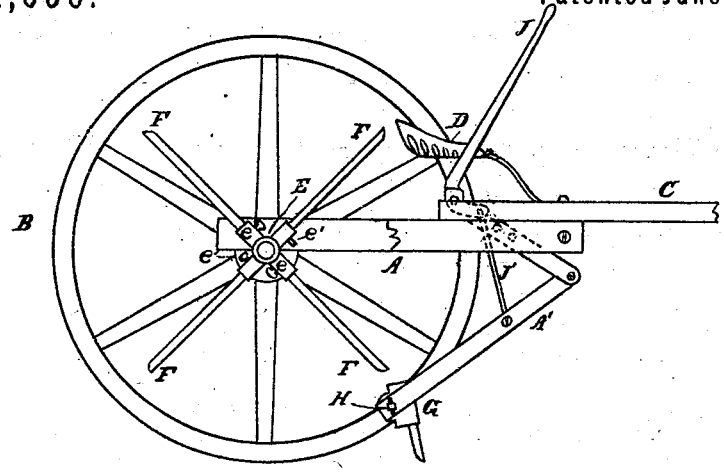
Figure 2:
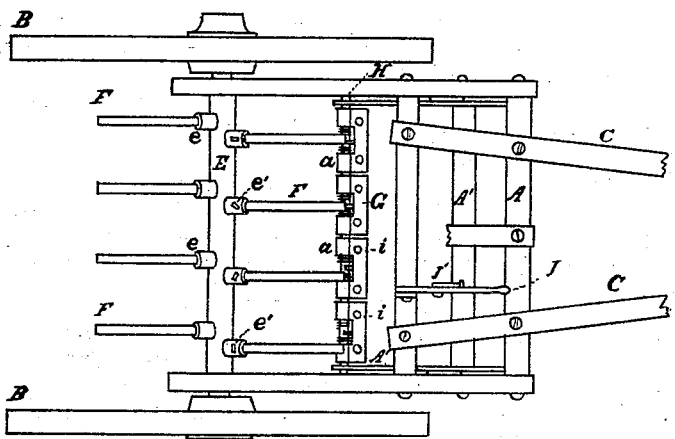
Figure 3:
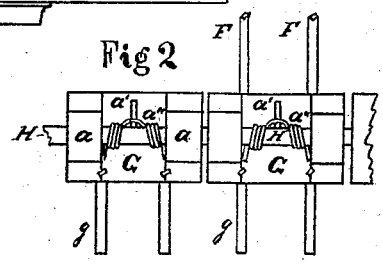

Figure 1 is a top or plan view of my improved device; Fig. 2, a side elevation of the same; and Fig. 3, a rear view of a portion of the rake detached.

Like letters of reference indicate like parts.

In the drawing, A represents the frame of my improved implement. B B are the wheels. C C are the thills, and D is the driver's seat. The wheels are rigidly mounted on an axle extending entirely across the rear part of the frame A, and turning in bearings therein. The thills and the seat are attached to the said frame. E is a sleeve, made either continuous, as shown, or in sections, and rigidly attached to the wheel-axle. $e\ e$ are sockets extending radially from the said sleeve, and F F are removable arms or teeth arranged in the said sockets, and retained therein by means of the set-screws $e'\ e'$. A' is the rake-frame. The forward end of this frame is so jointed to the frame A as to render the rear end of the former frame capable of being raised and lowered. G is the rake-head or tooth-rack, and $g\ g$ are the rake-teeth. The part G may be made either in sections, as shown, or in one piece. H is a rod or cross-bar, extending across the rear end of the frame A'. This rod is rendered incapable of being turned on its axis, and for that purpose its ends are preferably square or polygonal, and rest in correspondingly-formed bearings in the frame A'. I also deem it preferable to make the rod H removable. $a\ a$ are hubs or projections extending from the rear face of the parts G G, the latter of which are suspended on the rod H, which passes freely through the parts $a\ a$, so as to admit of a rotary movement of the parts G G. $a'\ a'$ are pins extending from the rod H. $a''\ a''$ are spring-wires looped over the pins $a'\ a'$, and then coiled loosely around the rod H, and terminating in arms lying on the parts G G, as is plainly shown in Fig. 3. $i\ i$ are sockets in the parts G G, to receive the teeth or arms F F, when the latter are removed from the sockets $e\ e$ for the purpose hereinafter set forth. J is a bent lever pivoted to the frame A, and arranged near the driver's seat, and J' is a connecting-rod jointed to the lower end of the lever J and to the frame A', so that the rear end of the latter and its attachments may be readily raised and lowered by the driver through the instrumentality of the said lever.

The operation of the implement is as follows: In raking hay, for example, the hay is gathered in front of the teeth $g\ g$, while the implement is being drawn forward. If any unusual obstructions—such as large stones—are presented to these teeth, the latter will yield rearwardly until the obstruction is passed. When the obstruction is passed, the rake-teeth are thrown forward to their original position, by the action of the springs $a''\ a''$, and the pins $a'\ a'$ limit their forward movement. When the tooth-rack is made in sections, only that set of teeth will yield which is met by an obstruction, and the teeth will also yield and conform to uneven ground, and thus do their work more thoroughly. If it is intended to perform the operation of raking only, the teeth or arms F F should first be removed from the sockets $e\ e$, and arranged in the sockets $i\ i$. A considerable bunch of hay will then be accumulated before the rake, and this bunch may be released at the proper time by means of the lever J.

In order to use the implement as a tedder, or as a rake and tedder, the arms or teeth F F should remain in the sockets $e\ e$. The hay will accumulate before the teeth $g\ g$, as before described, until it reaches the teeth or arms F F, and as the latter are revolved they drag the accumulated hay rearward, and scatter it upon the ground, where it is left to become dry.

It will be perceived from the foregoing description that the teeth $g\ g$ and F F operate together as a tedder, and that the implement may be readily converted from a tedder into a rake, and from the latter into the former, without the employment of parts not found in the device.

Having thus described my invention, what I claim as new, and desire to secure by Letters Patent, is—

1. A hay-tedder provided with the removable tedder-arms F F, and with a rake having the sockets $i\ i$ therein to receive the said arms, for the purpose of rendering the rake operative independently of the tedder device, substantially as set forth.

2. The rake-head or tooth-rack, consisting of one or more parts, G G, suspended freely on a fixed rod, provided with one or more pins, $a'\ a'$, in combination with one or more springs, $a''\ a''$, arranged substantially as shown and described, and for the purposes set forth.

CHARLES MURRAY.

Witnesses:
F. F. WARNER,
N. C. GRIDLEY.